US012464011B1

(12) United States Patent
Lidgi et al.

(10) Patent No.: US 12,464,011 B1
(45) Date of Patent: Nov. 4, 2025

(54) TECHNIQUES FOR PRIORITIZING CYBERSECURITY REMEDIATION ACTIONS BASED ON A DATA RISK SCORE

(71) Applicant: Wiz, Inc., New York, NY (US)

(72) Inventors: Matilda Lidgi, Haifa (IL); Liron Levin, Kfar Saba (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/070,170

(22) Filed: Mar. 4, 2025

(51) Int. Cl.
*H04L 9/40* (2022.01)

(52) U.S. Cl.
CPC .............................. *H04L 63/1441* (2013.01)

(58) Field of Classification Search
CPC . H04L 63/1433; H04L 63/20; H04L 63/1416; H04L 63/1441; H04L 63/1425; H04L 63/1408; H04L 63/145; H04L 63/1466; G06F 21/577; G06F 21/05
See application file for complete search history.

(56) References Cited

U.S. PATENT DOCUMENTS

| | | | |
|---|---|---|---|
| 10,410,158 B1 * | 9/2019 | Yumer | G06N 20/00 |
| 10,496,827 B1 | 12/2019 | Ridner et al. | |
| 10,848,517 B1 | 11/2020 | Yampolskiy et al. | |
| 10,868,825 B1 | 12/2020 | Dominessy et al. | |
| 2018/0032736 A1 * | 2/2018 | Inagaki | G06F 3/04817 |
| 2024/0430289 A1 * | 12/2024 | Engelberg | H04L 63/1433 |
| 2025/0055869 A1 * | 2/2025 | Barel | H04L 63/1433 |

\* cited by examiner

*Primary Examiner* — Ali S Abyaneh
(74) *Attorney, Agent, or Firm* — M&B IP Analysts, LLC (57) ABSTRACT

A system and method for prioritizing remediation actions for cybersecurity issues in a cloud computing environment based on a data risk score is presented. The method includes detecting a plurality of data objects in the computing environment, the computing environment including a plurality of resources and principals; determining a cybersecurity context for each detected data object; generating a representation of each data object, each resource, and each principal in a security database; detecting in the security database a resource representation connected to a data object representation, wherein a cybersecurity context is determined for the resource; generating a cybersecurity risk score based on the cybersecurity context of the data object and the cybersecurity context of the resource; prioritizing a plurality of remediation actions based on the generated cybersecurity risk score; and executing a remediation action based on the prioritization.

15 Claims, 3 Drawing Sheets

TECHNIQUES FOR PRIORITIZING CYBERSECURITY REMEDIATION ACTIONS BASED ON A DATA RISK SCORE

TECHNICAL FIELD

The present disclosure relates generally to cybersecurity, and specifically to prioritizing cybersecurity issues in a networked computing environment to minimize exposure.

BACKGROUND

In cybersecurity, remediation refers to the process of identifying, addressing, and resolving security vulnerabilities and threats to protect systems from attacks. This can involve patching software, reconfiguring settings, removing malware, or improving security policies. The goal is to eliminate or mitigate risks to maintain system integrity and prevent exploitation.

The biggest challenge in prioritizing remediation actions is balancing risk, urgency, and resource constraints. Not all vulnerabilities pose the same level of threat, and security teams must assess potential impact, exploitability, and business criticality. High-risk vulnerabilities that are actively exploited may require immediate action, but limited time, personnel, and operational dependencies can slow remediation efforts.

Organizations also face challenges in distinguishing real threats from theoretical risks, leading to decision paralysis or misallocation of resources. Additionally, patching or changing configurations can disrupt business operations, making it difficult to act quickly without causing downtime. Effective prioritization requires accurate risk assessment, automation, and coordination between security and IT teams to address the most critical issues without overwhelming systems or personnel.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include detecting a plurality of data objects in the cloud computing environment, the cloud computing environment including a plurality of resources and a plurality of principals. The method may also include determining a cybersecurity context for each detected data object. The method may furthermore include generating a representation of each data object, each resource of the plurality of resources, and each principal of the plurality of principals in a security database. The method may in addition include detecting in the security database at least a resource representation connected to a data object representation, where a cybersecurity context is determined for the at least a resource. The method may moreover include generating a cybersecurity risk score based on the cybersecurity context of the data object and the cybersecurity context of the at least a resource. The method may also include prioritizing a plurality of remediation actions based at least on the generated cybersecurity risk score. The method may furthermore include executing a remediation action of the plurality of remediation actions based on the prioritization. Other embodiments of this aspect include corresponding computer systems, apparatus, and computer programs recorded on one or more computer storage devices, each configured to perform the actions of the methods.

Implementations may include one or more of the following features. The method may include: sampling data of the detected data object; and determining the cybersecurity context of the data object based on the sampled data. The method may include: inspecting the at least a resource for a cybersecurity object, where the cybersecurity object indicates a cybersecurity risk; and generating the cybersecurity risk score further based on the cybersecurity risk. The method where inspecting the at least a resource further may include: generating an inspectable disk based on a disk of the resource; and inspecting the inspectable disk for the cybersecurity object. The method may include: generating the plurality of remediation actions, each remediation action corresponding to an environment of the computing environment. The method may include: generating a state for an entity of the computing environment, where a representation of the entity is connected in the security graph to a representation of the data object; and generating the cybersecurity risk score further based on the state. The method may include: generating the state based on at least an event record of an event log of the cloud computing environment. The method may include: detecting a plurality of network paths between a resource configured to access the data object and an endpoint of the cloud computing environment; actively inspecting each network path of the plurality of network paths to detect a viable network path, where the viable network path is accessible from a network external to the cloud computing environment; and generating the cybersecurity risk score further based on the viable network path. The method may include: reprioritizing a portion of the remediation actions in response to executing at least one remediation action. Implementations of the described techniques may include hardware, a method or process, or a computer tangible medium.

In one general aspect, a non-transitory computer-readable medium may include one or more instructions that, when executed by one or more processors of a device, cause the device to: detect a plurality of data objects in the cloud computing environment, the cloud computing environment including a plurality of resources and a plurality of principals; determine a cybersecurity context for each detected data object; generate a representation of each data object, each resource of the plurality of resources, and each principal of the plurality of principals in a security database; detect in the security database at least a resource representation connected to a data object representation, where a cybersecurity context is determined for the at least a resource; generate a cybersecurity risk score based on the cybersecurity context of the data object and the cybersecurity context of the at least a resource; prioritize a plurality of remediation actions based at least on the generated cybersecurity risk score; and execute a remediation action of the plurality of remediation actions based on the prioritization. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect a plurality of data objects in the cloud computing environment, the cloud computing environment including a plurality of resources and a plurality of principals. The system may in addition determine a cybersecurity context for each detected data object. The system may moreover generate a representation of each data object, each resource of the plurality of resources, and each principal of the plurality of principals in a security database. The system may also detect in the security database at least a resource representation connected to a data object representation, where a cybersecurity context is determined for the at least a resource. The system may furthermore generate a cybersecurity risk score based on the cybersecurity context of the data object and the cybersecurity context of the at least a resource. The system may in addition prioritize a plurality of remediation actions based at least on the generated cybersecurity risk score. The system may moreover execute a remediation action of the plurality of remediation actions based on the prioritization. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: sample data of the detected data object; and determine the cybersecurity context of the data object based on the sampled data. The system where the memory contains further instructions which when executed by the processing circuitry further configure the system to: inspect the at least a resource for a cybersecurity object, where the cybersecurity object indicates a cybersecurity risk; and generate the cybersecurity risk score further based on the cybersecurity risk. The system where the memory contains further instructions that, when executed by the processing circuitry for inspecting the at least a resource, further configure the system to: generate an inspectable disk based on a disk of the resource; and inspect the inspectable disk for the cybersecurity object. The system where the memory contains further instructions which when executed by the processing circuitry further configure the system to: generate the plurality of remediation actions, each remediation action corresponding to an environment of the computing environment. The system where the memory contains further instructions which when executed by the processing circuitry further configure the system to: generate a state for an entity of the computing environment, where a representation of the entity is connected in the security graph to a representation of the data object; and generate the cybersecurity risk score further based on the state. The system where the memory contains further instructions which when executed by the processing circuitry further configure the system to: generate the state based on at least an event record of an event log of the cloud computing environment. The system where the memory contains further instructions which when executed by the processing circuitry further configure the system to: detect a plurality of network paths between a resource configured to access the data object and an endpoint of the cloud computing environment; actively inspect each network path of the plurality of network paths to detect a viable network path, where the viable network path is accessible from a network external to the cloud computing environment; and generate the cybersecurity risk score further based on the viable network path. The system where the memory contains further instructions which when executed by the processing circuitry further configure the system to: reprioritize a portion of the remediation actions in response to executing at least one remediation action. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
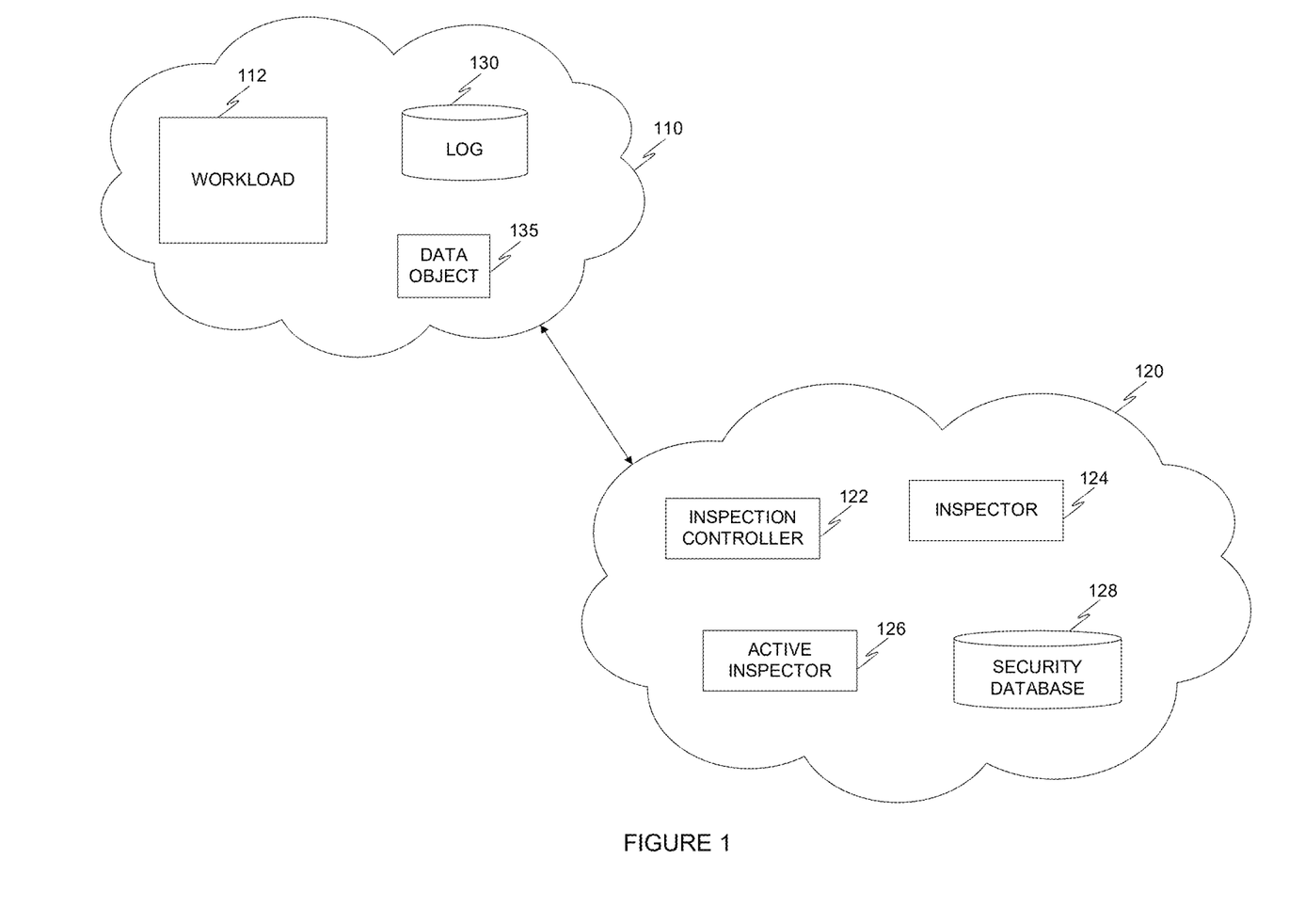
FIG. 1 is an example schematic diagram of a computing environment and an inspection environment, implemented in accordance with an embodiment.

FIG. 1 is an example schematic diagram of a computing environment and an inspection environment, implemented in accordance with an embodiment. In an embodiment, a computing environment 110 includes a plurality of resources, a plurality of principals, a combination thereof, and the like. According to an embodiment, a computing environment 110 is a cloud computing environment, an on-prem computing environment, a hybrid computing environment, a networked computing environment, a combination thereof, and the like.

For example, a cloud computing environment includes a virtual private cloud (VPC), a virtual network (VNet), a virtual private network (VPN), a combination thereof, and the like. In an embodiment, the cloud computing is implemented on a cloud computing infrastructure, such as Amazon® Web Services (AWS), Google® Cloud Platform (GCP), Microsoft® Azure, and the like. In an embodiment, the computing environment 110 includes multiple computing environments, including a portion of which are implemented on a first cloud computing infrastructure, and a portion of which are implemented on a second cloud computing infrastructure.

In some embodiments, a resource is a computing entity which exposes a hardware resource (e.g., a processing circuitry, a memory, a storage, etc.), a virtual resource, an action, and the like, in the computing environment. For example, according to an embodiment, a workload 112 is a resource. In an embodiment, a workload 112 is a virtualization, such as a virtual machine, a software container, a serverless function, a nested virtualization, a combination thereof, and the like.

In an embodiment, a virtual machine is implemented utilizing Oracle® VirtualBox®, a software container is deployed on a Kubernetes® platform, and a serverless function is implemented utilizing Amazon Lambda®.

In certain embodiments, the computing environment 110 includes a repository, such as a code repository, a software image repository, a version control system (VCS), a combination thereof, and the like. In some embodiments, the computing environment 110 is configured to provision resources of the computing environment 110 to deploy a virtualization (such as the workload 112) in the computing environment 110 based on a code object, a software image, and the like, which is stored in the repository. In an embodiment, a VCS utilizes, for example, a Git® platform.

In some embodiments, the computing environment 110 includes a log 130. In an embodiment, the log 130 includes access events between workloads, resources, principals, and the like, in the computing environment 110. For example, in an embodiment, a principal (e.g., a user account) accesses the workload 112, and an event record is stored in the log 130 to indicate the access event. In certain embodiments, the log 130 includes access events, indicating when a resource was accessed, when a data object 135 was accessed, an identifier of a principal performing the access, a combination thereof, and the like.

According to an embodiment, a data object 135 is a sensitive data, personally identifiable information (PII), payment card information (PCI), personal health information (PHI), a combination thereof, and the like. In some embodiments, a log 130, a database storing thereon data objects 135, a combination thereof, and the like, are sampled to determine what data is stored thereon, what type of data is stored thereon, etc.

In an embodiment, the computing environment 110 is monitored by an inspection environment 120. In some embodiments, the inspection environment 120 is implemented as a cloud computing environment, a hybrid computing environment, etc. In an embodiment, a portion of the inspection environment 120 is implemented in the computing environment 110, and a portion of the inspection environment 120 is implemented externally to the computing environment 110. According to an embodiment, the inspection environment 120 is implemented entirely externally to the computing environment 110, with access provided to a principal of the inspection environment 120 to the computing environment 110.

According to an embodiment, the inspection environment 120 includes an inspection controller 122, an inspector 124, an active inspector 126, a security database 128, a combination thereof, and the like. In an embodiment, the inspection controller 122 is configured to initiate inspection of the computing environment 110.

In some embodiments, the inspection controller 122 is configured to detect a plurality of resources deployed in the computing environment 110 and initiate inspection for the resources. For example, in an embodiment, the inspection controller 122 is configured to access an API of a cloud computing environment to receive a list of resources deployed therein. In an embodiment, inspection is initiated by the inspection controller 122 periodically for each resource in the list of resources.

In an embodiment, the inspection controller 122 is configured to provision an inspector 124 to inspect a virtualization deployed in the computing environment 110. In some embodiments, the inspector 124 is configured to inspect a workload 112 for a cybersecurity object. In an embodiment, a cybersecurity object is a data object 135, a code object, a file, a filesystem, a folder, an application, a secret, a cryptographic key, a cloud key, a certificate, a password, a binary, a library, a registry, a combination thereof, and the like. In an embodiment, the cybersecurity object indicates a cybersecurity threat. In some embodiments, a plurality of detected cybersecurity objects indicate together a cybersecurity threat.

In certain embodiments, the inspection controller 122 is configured to detect a disk, for example, associated with the workload 112, and generate an inspectable disk based on the disk of the workload 112. In an embodiment, an inspectable disk is a cloned disk, a snapshot of a disk, a copy of a disk, a combination thereof, and the like. In some embodiments, a snapshot of a disk requires that a volume is generated based on the snapshot prior to inspection, whereas a cloned disk is available practically instantaneously for inspection. In an embodiment, an inspector 124 is configured to perform static analysis of an inspectable disk, perform static analysis on code objects, a combination thereof, and the like.

According to an embodiment, the inspection controller 122 is configured to detect network paths in the computing environment 110. For example, in an embodiment, the inspection controller 122 is configured to detect a network path between a workload 112 and another workload (not shown) in the computing environment 110. In some embodiments, the inspection controller is configured to detect a network path between the workload 112 and an external network, which is not a part of the computing environment 110.

In an embodiment, a network path includes representations of hardware resources, virtual resources, network components, gateways, firewalls, load balancers, IP addresses, proxy servers, web servers, API endpoints, a combination thereof, and the like. In an embodiment, the network path further includes a connection (represented, for example, by an edge in a security graph) between a first workload and a second workload. In some embodiments, the connection type indicates a permission, an access, etc.

In certain embodiments, an active inspector 126 is configured to actively inspect a resource, for example, through an external network. In an embodiment, active inspection includes generating a network access instruction which, when executed over a network path, results in an outcome, such as a success or failure. For example, in an embodiment, a network access instruction is an Internet Control Message Protocol (ICMP) command, a hypertext transfer protocol (HTTP) command, a combination thereof, and the like. In some embodiments, the network access instruction includes an IP address, a port, a credential, a username, a password, a combination thereof, and the like.

According to an embodiment, results of an inspection (e.g., detected cybersecurity objects), results of an active inspection, results of network discovery, a combination thereof, and the like, are stored in a security database 128. In some embodiments, the security database 128 includes a representation of the computing environment 110. In an embodiment, the security database 128 stores the representation of the computing environment 110 based on a unified data schema.

In some embodiments, a unified data schema includes a mapping from a plurality of data schemas, for example each data schema corresponding to a unique cloud computing environment (e.g., AWS, GCP, etc.), such that a virtual machine from AWS and a virtual machine from GCP are both represented utilizing the same unified data schema.

In an embodiment, the security database 128 is implemented as a graph database, such as Node4j®, which stores thereon a security graph. In some embodiments, the security graph includes nodes and edges, wherein a node represents, for example, a computing entity (e.g., cloud entity), and an edge represents a type of connection, relationship, and the like, between the two nodes connected by the edge.

In an embodiment, a context is determined for each object, entity, and the like, which is in the computing environment 110. In some embodiments, a context includes an environment context, a data context, a cybersecurity risk context, a combination thereof, and the like. In an embodiment, a cybersecurity risk score is determined based on the determined context.

In certain embodiments, a data context is generated based on a sample of data objects, such as data object 135. For example, in an embodiment, a database application is detected in the computing environment by an inspector 124. In an embodiment, the inspector is further configured to detect metadata of the database, such as a database schema, table names, column names, etc. In some embodiments, the inspector 124 is further configured to sample data to detect a data type.

In some embodiments, a state is generated for a representation. In an embodiment, the state is generated based on the log 130. In some embodiments, the state is generated based on events detected in the log 130, including events having an identifier which corresponds to an identifier of the representation. For example, an identifier is an identifier of a user account, an identifier of a virtual machine, etc.

In some embodiments, a log 130 is a network log, a cloud log, an event log, a runtime execution data log, a combination thereof, and the like. In certain embodiments, a log is implemented utilizing, for example, CloudTrail™. In an embodiment, a state of an entity is determined based on an identifier of the entity detected in certain events, records, etc., in the log 130.

According to an embodiment, a state includes a recent event related to the entity, a baseline of behavior generated based on a plurality of event records in the log 130, a combination thereof, and the like. For example, in an embodiment, a baseline of access to a resource is generated based on access events which include an identifier of the resource (such as a name from a namespace).

In an embodiment, a cybersecurity risk is determined for an entity. In some embodiments, the cybersecurity risk is further determined based on a type of object, for example a data object that includes sensitive data, such as PII (personal identifiable information) poses a higher cybersecurity risk than a data object that includes names of cities. In an embodiment, a cybersecurity risk is assigned a risk score. In some embodiments, the risk score is quantitative, qualitative, a combination thereof, and the like. For example, in an embodiment, a quantitative score ranges from 0 to 10, a qualitative score ranges from 'low' to 'high', etc.

In certain embodiments, a cybersecurity risk score is further determined based on a state associated with an entity, based on accessibility of the entity, based on exposure of the entity, a combination thereof, and the like.

In an embodiment, a cybersecurity score is determined for a data object 135. According to an embodiment, the cybersecurity score is determined for the data object 135 based on a context of an entity associated with the data object 135, based on a state of an entity associated with the data object 135, based on a cybersecurity issue associated with the data object 135, a combination thereof, and the like.

For example, in an embodiment, a data object 135 is accessible by an entity (e.g., a user account) which is represented in the security database 128. In an embodiment, a representation of the data object 135 is connected in the security database 128 to a representation of the entity. In some embodiments, the connection indicates a relationship (e.g., 'can access'). In certain embodiments, the representation of the entity is associated with a cybersecurity issue (e.g., the representation of the entity is connected with a representation of a cybersecurity issue). A cybersecurity issue may be an exposure, a weak password, a misconfiguration, a vulnerability, a combination thereof, and the like.

In some embodiments, the data object 135 is sampled to determine a type of data stored thereon. In an embodiment, a risk score is determined for the data object based on a risk associated with the entity which can access the data object 135. In certain embodiments, the inspection controller 122 is configured to initiated remediation actions, mitigation actions, etc., in the computing environment 110. In an embodiment, the inspection controller 122 is configured to prioritize the remediation actions, mitigation actions, and the like, based on the determined risk score.

In an embodiment, a remediation action, mitigation action, and the like, includes generating an alert, updating an alert, generating a severity score, generating an issue ticket, revoking a permission, assigning a permission, revoking a role, deprovisioning a resource, a combination thereof, and the like. In some embodiments, a plurality of remediation actions, mitigation actions, etc., are executed in the competing environment in an order based on the determined risk score.

Figure 2:
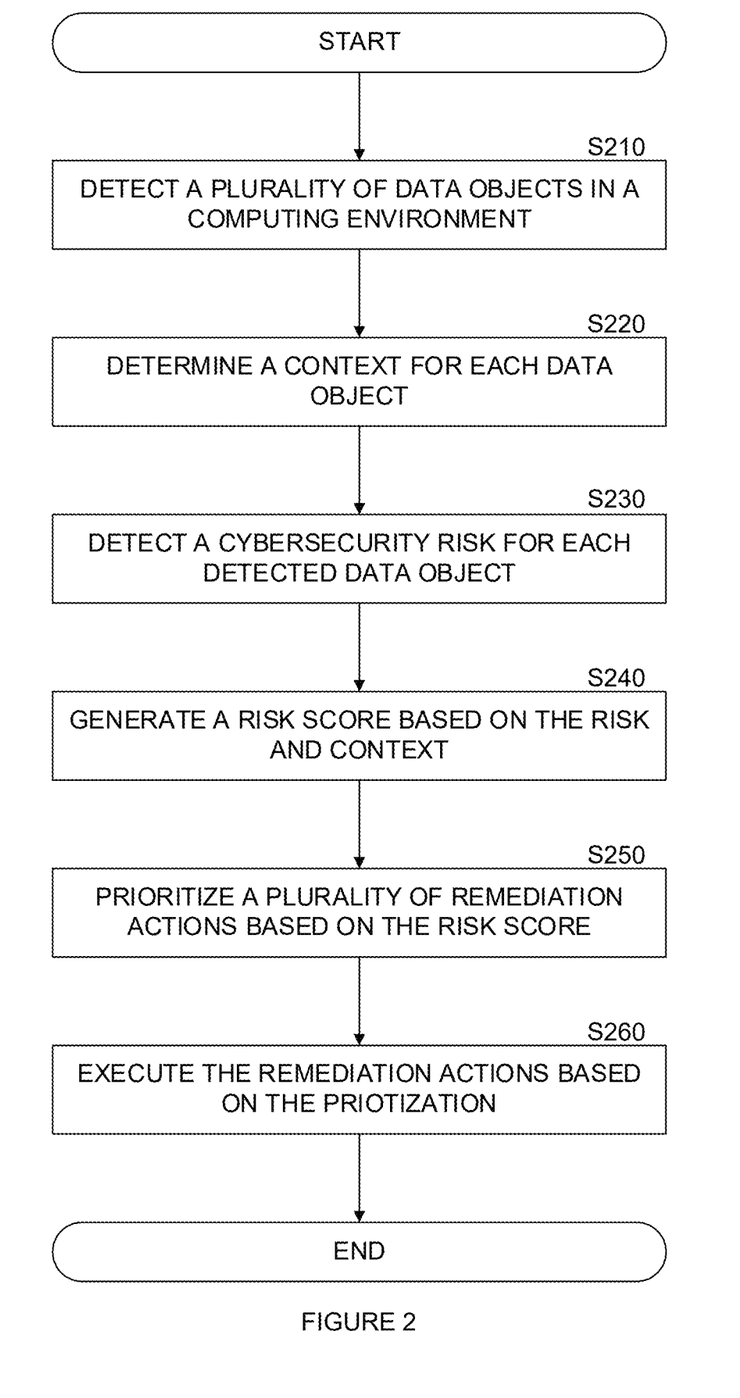
FIG. 2 is an example flowchart of a method for prioritizing remediation actions in a computing environment based on cybersecurity risk scores of data objects, implemented in accordance with an embodiment.

FIG. 2 is an example flowchart of a method for prioritizing remediation actions in a computing environment based on cybersecurity risk scores of data objects, implemented in accordance with an embodiment.

At S210, a plurality of data objects are detecting in a computing environment. In an embodiment, a data object is a data base, a data file, a bucket, a data schema, a combination thereof, and the like. In an embodiment, a data object includes metadata of the data object. Metadata is, for example, a data type (e.g., PII, PCI, PHI, etc.), a data schema indicating names of columns, etc.

In an embodiment, the plurality of data objects are detected in a storage, such as a disk of a workload, a bucket, etc. In an embodiment, a disk is inspected for data objects, cybersecurity objects, and the like. In some embodiments, a cybersecurity object is a password, a key, a cloud key, a cryptographic key, a certificate, a file, a folder, a filesystem, an application, a binary file, a software library, a code object, a data object, a registry record, a combination thereof, and the like.

In certain embodiments, a cybersecurity object indicates a cybersecurity issue, a cybersecurity threat, a vulnerability, a misconfiguration, an exposure, a cybersecurity risk, a combination thereof, and the like. In an embodiment, a plurality of cybersecurity objects indicate together the cybersecurity issue, etc., in a toxic combination (e.g., weak password and sensitive data on the same workload).

In some embodiments, a representation of each data object, of each cybersecurity object, of each entity of a computing environment, etc., is generated. In certain embodiments the representation is generated based on a unified data schema. In an embodiment, the representation is stored in a security database, for example as a graph in a graph database (such as Node4j®). In an embodiment, a representation of a resource is connected to a representation of a data object, to indicate that the data object is stored on the resource. In some embodiments, a representation of a principal is generated and connected to the data object, to the representation of the resource, etc., to indicate that the principal is authorized to access the data object.

At S220, a context is determined for each data object. In an embodiment, a context is generated based on at least the data object. In some embodiments, a context includes the state of the data object, the state of entities associated with the data object, a combination thereof, and the like.

In an embodiment, a state is generated based on events in an event log, such as a cloud log, networking log, identity and access management log, a combination thereof, and the like. For example, in an embodiment, an entity (e.g., identifier of a user account, identifier of a resource, etc.) is detected in an event record stored in an event log. In an embodiment, a behavior baseline is generated based on a plurality of such event records for the entity. In some embodiments, the state is generated based on the last event record, on a combination of event records, etc.

In an embodiment, the context is generated further based on entities associated with the data object. For example, in an embodiment, a query is executed on a security database to detect entities which are connected in the security database to a representation of the data object. In an embodiment, a context is generated based on entities which are connected to the data object. For example, in an embodiment, the context of the data object is generated based on a context of a principal (e.g., user account) which is authorized to access the data object. Where the context of the principal indicates, for example, that the principal has a weak password, the data object is more at risk than if the principal had a strong password.

In some embodiments, a context is generated further based on a software bill of materials (SBOM). In an embodiment, an inspector is configured to inspect resources in a computing environment for software application, binary files, software libraries, and the like, and generate therefrom an SBOM for the computing environment. In certain embodiments, the context is generated further based on the SBOM of the computing environment, on an SBOM of a particular resource on which the data object is stored, on an SBOM of a resource through which the data object is accessible, etc.

At S230, a cybersecurity risk is detected for a data object. In an embodiment, the cybersecurity risk is detected based on the data object, based on an entity associated with the data object, a combination thereof, and the like. In certain embodiments, detecting a cybersecurity risk is based on a cybersecurity object which is present, accessible by, associated with, etc., the resource on which the data object is stored.

In some embodiments, the cybersecurity risk is detected based on a plurality of cybersecurity objects, based on the data object and a cybersecurity object, etc. For example, a data object is sampled to detect that the data object includes sensitive data. In an embodiment, the data object is further determined to be accessible through an API endpoint which is an exposed API endpoint. In an embodiment, the risk score is determined based on the sampled data, the exposed API endpoint, etc.

In certain embodiments, detecting a cybersecurity risk includes initiating inspection for each entity that is connected to the data object in the security database. According to an embodiment, a cybersecurity risk is detected based on a result of static analysis.

At S240, a risk score is generated. In an embodiment, the risk score is generated based on the detected cybersecurity risk, based on the context of the data object, based on a context of an entity connected to the data object, based on the state of the data object, based on a state of an entity connected to the data object, a combination thereof, and the like.

In an embodiment, the risk score is a qualitative score, a quantitative score, a combination thereof, and the like. In an embodiment, qualitative score is, for example 'low' to 'high', 'low' to 'severe', etc. In some embodiments, a quantitative score is, for example '1' to '10', with '1' being the lowest score, indicating little to no risk.

In an embodiment, the risk score is generated periodically. For example, according to an embodiment, a plurality of data objects are detected, and a risk score is generated for each periodically, such that where a context changes, a cybersecurity issue is partially (or fully) resolved, etc., the risk score is updated to reflect this.

In some embodiments, the risk score is further determined based on a result of active inspection. For example, where a plurality of potential network paths are detected between an endpoint of the computing environment and a data object, resource hosting the data object, resource configured to access the data object, etc., active inspection is performed, for example by an active inspector, to determine if a potential network path is a viable network path.

In an embodiment, where a network path is a viable network path (i.e., accessible from an external network), the risk score is further determined based on the network path. In some embodiments, the risk score is determined based on a number of network objects (e.g., router, firewall, gateway, load balancer, proxy, etc.) along the network path, based on the determined accessibility of each such network object, a combination thereof, and the like.

At S250, a plurality of remediation actions are prioritized for execution. In an embodiment, an inspection controller is configured to prioritize remediation actions based on the determined cybersecurity risk score. In some embodiments, a plurality of remediation actions are detected for each data object having a cybersecurity issue (i.e., multiple remediation actions for the same issue). For example, a first remediation action to address a cybersecurity issue of a data object is in a control plane of the computing environment, a second remediation action to address the cybersecurity issue of the data object is in the data plane of the computing environment, etc.

In an embodiment, the remediation actions are further prioritized based on an environment of the computing environment. For example, a computing environment, such as a cloud computing environment, can include a production environment, a staging environment, a testing environment, a CI/CD, an IaC, etc., in any of which a remediation action can be initiated, according to an embodiment, to address the same cybersecurity issue.

In some embodiments, the plurality of remediation actions are prioritized for execution periodically. For example, in an embodiment, the risk scores are updated periodically, and accordingly the remediation action execution prioritization is likewise periodically to allow for reprioritizing remediation actions which have a higher risk score than previously.

At S260, the plurality of remediation actions are executed. In an embodiment, the remediation action are executed in the computing environment based on the determined prioritization. In some embodiments, execution of a remediation action generates a result, and the remaining remediation actions are prioritized again based on the generated result.

In an embodiment, executing a remediation action in a computing environment includes generating an action, initiating an action, initiating a request, initiating a query, configuring a resource to initiate an action, a combination thereof, and the like. In an embodiment, executing remediation actions based on a priority allows to address more urgent cybersecurity issues first, while utilizing a number of compute resources of the computing environment which does not exceed a predetermined allocation of resources.

Figure 3:
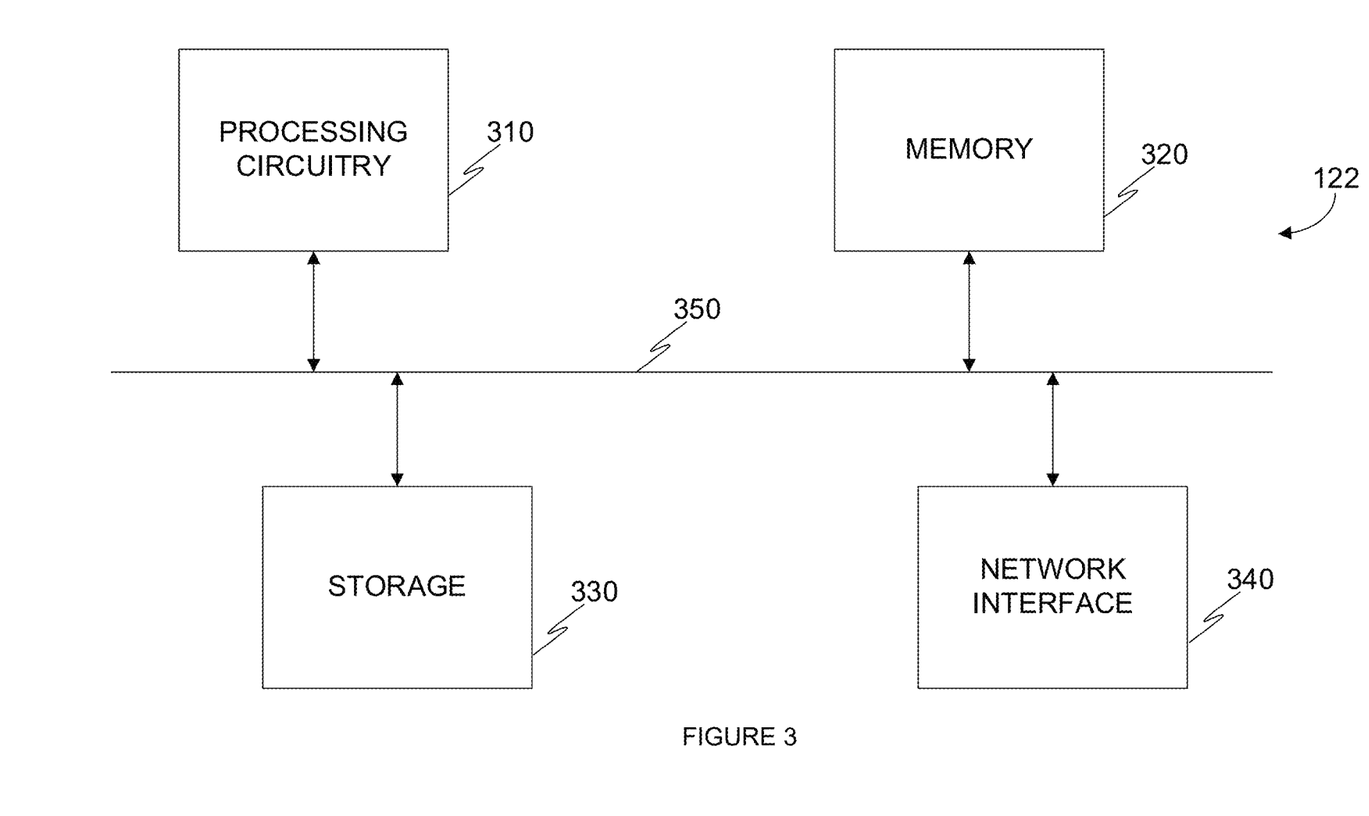
FIG. 3 is an example schematic diagram of an inspection controller according to an embodiment.

FIG. 3 is an example schematic diagram of an inspection controller 122 according to an embodiment. The inspection controller 122 includes, according to an embodiment, a processing circuitry 310 coupled to a memory 320, a storage 330, and a network interface 340. In an embodiment, the components of the inspection controller 122 are communicatively connected via a bus 350.

In certain embodiments, the processing circuitry 310 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 320 is a volatile memory (e.g., random access memory, etc.), a non-volatile memory (e.g., read only memory, flash memory, etc.), a combination thereof, and the like. In some embodiments, the memory 320 is an on-chip memory, an off-chip memory, a combination thereof, and the like. In certain embodiments, the memory 320 is a scratch-pad memory for the processing circuitry 310.

In one configuration, software for implementing one or more embodiments disclosed herein is stored in the storage 330, in the memory 320, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 310, cause the processing circuitry 310 to perform the various processes described herein, in accordance with an embodiment.

In some embodiments, the storage 330 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 340 is configured to provide the inspection controller 122 with communication with, for example, the computing environment 110, according to an embodiment.

It should be understood that the embodiments described herein are not limited to the specific architecture illustrated in FIG. 3, and other architectures may be equally used without departing from the scope of the disclosed embodiments.

Furthermore, in certain embodiments, the inspector 124, active inspector 126, security database 128, a combination thereof, and the like, may be implemented with the architecture illustrated in FIG. 3. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for prioritizing remediation actions for cybersecurity issues in a cloud computing environment based on a data risk score, comprising:
   detecting a plurality of data objects in the cloud computing environment, the cloud computing environment including a plurality of resources and a plurality of principals;
   determining a cybersecurity context for each detected data object;
   generating a representation of each data object, each resource of the plurality of resources, and each principal of the plurality of principals in a security database;
   detecting in the security database at least a resource representation connected to a data object representation, wherein a cybersecurity context is determined for the at least a resource;
   generating a state for an entity of the computing environment, wherein a representation of the entity is connected in the security database to a representation of the data object, and wherein the state is generated based on at least an event record of an event log of the cloud computing environment;
   generating a cybersecurity risk score based on the state, the cybersecurity context of the data object and the cybersecurity context of the at least a resource;
   prioritizing a plurality of remediation actions based at least on the generated cybersecurity risk score; and
   executing a remediation action of the plurality of remediation actions based on the prioritization.

2. The method of claim 1, further comprising:
   sampling data of the detected data object; and
   determining the cybersecurity context of the data object based on the sampled data.

3. The method of claim 1, further comprising:
   inspecting the at least a resource for a cybersecurity object, wherein the cybersecurity object indicates a cybersecurity risk; and
   generating the cybersecurity risk score further based on the cybersecurity risk.

4. The method of claim 3, wherein inspecting the at least a resource further comprises:
   generating an inspectable disk based on a disk of the resource; and
   inspecting the inspectable disk for the cybersecurity object.

5. The method of claim 1, further comprising:
   generating the plurality of remediation actions, each remediation action corresponding to an environment of the computing environment.

6. The method of claim 1, further comprising:
   detecting a plurality of network paths between a resource configured to access the data object and an endpoint of the cloud computing environment;
   actively inspecting each network path of the plurality of network paths to detect a viable network path, wherein the viable network path is accessible from a network external to the cloud computing environment; and
   generating the cybersecurity risk score further based on the viable network path.

7. The method of claim 1, further comprising:
   reprioritizing a portion of the remediation actions in response to executing at least one remediation action.

8. A non-transitory computer-readable medium storing a set of instructions for prioritizing remediation actions for cybersecurity issues in a cloud computing environment based on a data risk score, the set of instructions comprising:
   one or more instructions that, when executed by one or more processors of a device, cause the device to:
      detect a plurality of data objects in the cloud computing environment, the cloud computing environment including a plurality of resources and a plurality of principals;
      determine a cybersecurity context for each detected data object;
      generate a representation of each data object, each resource of the plurality of resources, and each principal of the plurality of principals in a security database;
      detect in the security database at least a resource representation connected to a data object representation, wherein a cybersecurity context is determined for the at least a resource;
      generate a state for an entity of the computing environment, wherein a representation of the entity is connected in the security database to a representation of the data object, and wherein the state is generated based on at least an event record of an event log of the cloud computing environment;
      generate a cybersecurity risk score based on the state, the cybersecurity context of the data object and the cybersecurity context of the at least a resource;
      prioritize a plurality of remediation actions based at least on the generated cybersecurity risk score; and
      execute a remediation action of the plurality of remediation actions based on the prioritization.

9. A system for prioritizing remediation actions for cybersecurity issues in a cloud computing environment based on a data risk score comprising:
   a processing circuitry;
   a memory, the memory containing instructions that, when executed by the processing circuitry, configure the system to:
   detect a plurality of data objects in the cloud computing environment, the cloud computing environment including a plurality of resources and a plurality of principals;
   determine a cybersecurity context for each detected data object;
   generate a representation of each data object, each resource of the plurality of resources, and each principal of the plurality of principals in a security database;
   detect in the security database at least a resource representation connected to a data object representation, wherein a cybersecurity context is determined for the at least a resource;
   generate a state for an entity of the computing environment, wherein a representation of the entity is connected in the security database to a representation of the data object, and wherein the state is generated based on at least an event record of an event log of the cloud computing environment;
   generate a cybersecurity risk score based on the state, the cybersecurity context of the data object and the cybersecurity context of the at least a resource;
   prioritize a plurality of remediation actions based at least on the generated cybersecurity risk score; and execute a remediation action of the plurality of remediation actions based on the prioritization.

10. The system of claim 9, wherein the memory contains further instructions which when executed by the processing circuitry further configure the system to:
   sample data of the detected data object; and
   determine the cybersecurity context of the data object based on the sampled data.

11. The system of claim 9, wherein the memory contains further instructions which when executed by the processing circuitry further configure the system to:
   inspect the at least a resource for a cybersecurity object, wherein the cybersecurity object indicates a cybersecurity risk; and
   generate the cybersecurity risk score further based on the cybersecurity risk.

12. The system of claim 11, wherein the memory contains further instructions that, when executed by the processing circuitry for inspecting the at least a resource, further configure the system to:
   generate an inspectable disk based on a disk of the resource; and
   inspect the inspectable disk for the cybersecurity object.

13. The system of claim 9, wherein the memory contains further instructions which when executed by the processing circuitry further configure the system to:
   generate the plurality of remediation actions, each remediation action corresponding to an environment of the computing environment.

14. The system of claim 9, wherein the memory contains further instructions which when executed by the processing circuitry further configure the system to:
   detect a plurality of network paths between a resource configured to access the data object and an endpoint of the cloud computing environment;
   actively inspect each network path of the plurality of network paths to detect a viable network path, wherein the viable network path is accessible from a network external to the cloud computing environment; and
   generate the cybersecurity risk score further based on the viable network path.

15. The system of claim 9, wherein the memory contains further instructions which when executed by the processing circuitry further configure the system to:
   reprioritize a portion of the remediation actions in response to executing at least one remediation action.

* * * * *